(12) United States Patent
Lenz

(10) Patent No.: US 7,893,337 B2
(45) Date of Patent: Feb. 22, 2011

(54) SYSTEM AND METHOD FOR LEARNING MUSIC IN A COMPUTER GAME

(76) Inventor: Evan Lenz, P.O. Box 126, Indianola, WA (US) 98342

( * ) Notice: Subject to any disclaimer, the term of this patent is extended or adjusted under 35 U.S.C. 154(b) by 0 days.

(21) Appl. No.: 12/456,082

(22) Filed: Jun. 10, 2009

(65) Prior Publication Data

US 2010/0313736 A1    Dec. 16, 2010

(51) Int. Cl.
G09B 15/00    (2006.01)
(52) U.S. Cl. ............... 84/477 R; 84/470 R; 84/609; 84/616
(58) Field of Classification Search .......... 84/470 R, 84/477 R, 609, 616
See application file for complete search history.

(56) References Cited

U.S. PATENT DOCUMENTS

| | | | |
|---|---|---|---|
| 4,651,612 A * | 3/1987 | Matsumoto | 84/650 |
| 4,919,030 A * | 4/1990 | Perron, III | 84/470 R |
| 5,227,574 A * | 7/1993 | Mukaino | 84/652 |
| 5,521,323 A * | 5/1996 | Paulson et al. | 84/610 |
| 5,574,238 A * | 11/1996 | Mencher | 84/483.2 |
| 5,715,179 A * | 2/1998 | Park | 702/182 |
| 5,886,273 A * | 3/1999 | Haruyama | 84/478 |
| 5,889,224 A * | 3/1999 | Tanaka | 84/645 |
| 5,906,494 A * | 5/1999 | Ogawa et al. | 434/307 A |
| 5,952,597 A * | 9/1999 | Weinstock et al. | 84/609 |
| 6,225,547 B1 * | 5/2001 | Toyama et al. | 84/611 |
| 6,281,422 B1 * | 8/2001 | Kawamura | 84/615 |
| 6,333,455 B1 * | 12/2001 | Yanase et al. | 84/609 |
| 6,376,758 B1 * | 4/2002 | Yamada et al. | 84/612 |
| 6,388,181 B2 * | 5/2002 | Moe | 84/477 R |
| 6,495,747 B2 * | 12/2002 | Shimaya et al. | 84/477 R |
| 6,915,488 B2 * | 7/2005 | Omori et al. | 715/773 |
| 7,129,407 B2 * | 10/2006 | Hiratsuka et al. | 84/609 |
| 7,164,076 B2 * | 1/2007 | McHale et al. | 84/616 |
| 7,271,329 B2 * | 9/2007 | Franzblau | 84/609 |
| 7,332,664 B2 * | 2/2008 | Yung | 84/470 R |
| 7,361,829 B2 * | 4/2008 | Uehara | 84/746 |
| 7,423,213 B2 * | 9/2008 | Sitrick | 84/477 R |
| 7,459,624 B2 * | 12/2008 | Schmidt et al. | 84/477 R |
| 7,521,619 B2 * | 4/2009 | Salter | 84/477 R |
| 7,525,035 B2 * | 4/2009 | Katsuta | 84/609 |
| 7,579,541 B2 * | 8/2009 | Guldi | 84/470 R |
| 7,612,278 B2 * | 11/2009 | Sitrick et al. | 84/609 |

(Continued)

*Primary Examiner*—Elvin G Enad
*Assistant Examiner*—Robert W Horn

(57) ABSTRACT

A system comprising means for receiving a first input from an electronic device, said first input pertaining to performance of music by a user, means for receiving a second input, said second input pertaining at least to music intended to be performed by the user; and a comparison module software executing on a computer and adapted to receive said first input and to receive said second input, wherein the comparison module compares the first input from a user to the second input to produce at least one indicia of the user's success in performing the intended music correctly, the comparison module sends to a display module associated with the user information including at least the music intended to be performed by the user and the indicia of the user's success in performing the intended music correctly, and the comparison module further sends to the display module associated with the user a timing signal suitable for indicating the speed at which the music should be shown on the display and played by the user, said timing signal computed according to one or more tempo modes selectable by the user, is disclosed.

4 Claims, 10 Drawing Sheets

U.S. PATENT DOCUMENTS

| | | | |
|---|---|---|---|
| 2003/0024375 A1* | 2/2003 | Sitrick | 84/477 R |
| 2006/0212148 A1* | 9/2006 | Fitzgerald et al. | 700/94 |
| 2007/0089590 A1* | 4/2007 | Katou | 84/609 |
| 2007/0163428 A1* | 7/2007 | Salter | 84/611 |
| 2008/0156171 A1* | 7/2008 | Guldi | 84/466 |
| 2010/0089221 A1* | 4/2010 | Miller | 84/470 R |

* cited by examiner

SYSTEM AND METHOD FOR LEARNING MUSIC IN A COMPUTER GAME

BACKGROUND OF THE INVENTION

1. Field of the Invention

The present invention relates generally to learning music through playing a musical computer or video game, and more specifically the invention provides a method for learning to play various musical instruments by providing real-time visual or auditory feedback.

2. Discussion to the State of the Art

Video games have become a major source of recreation especially for young people all across the globe. These games have showcased the amazing facility of the human brain and have led to new levels of dexterity in hand-eye coordination. More recently games that incorporate music, such as Guitar Hero™ and Dance Dance Revolution™, have taken the world by storm and demonstrated the widespread human desire to make music. Karaoke is another example of the great desire that so many people have to perform music. Although the majority of humanity seems to dream of being skilled at the art of making music, very few ever invest the time and resources necessary to actually become proficient. Games like Guitar Hero™ involve the participant in the music but actually do nothing to teach the gamer how to make real music. The mock guitar used in this game has no strings and does not attempt to teach hand placement. The Guitar Hero™ player merely taps on the appropriate colored fret button to match the color flashed on the screen. There is no real music notation to follow and learn from. Thus an expert Guitar Hero™ player is no better. Synthesia™ and Keyboard Mania™ are piano games that guide fingering and tempo by using scrolling colored bars. Another product currently on the market is Piano Wizard™. This game also starts with scrolling colors coded to the keys on a keyboard and progresses to colored notes and then makes the more difficult progression to standard notation. Piano Wizard™ quickly steers the user into traditional notation and its stumbling blocks. None of these products begin with real music notation and with the exception of Piano Wizard™ the intent is not to teach notation but to give the user an easier method of making music on a specialized keyboard. This does not allow the user to go to a real musical instrument and play without the scrolling colors and flashes associated with the video game.

The challenges associated with learning traditional music theory and notation provide a great roadblock that keeps many people from ever achieving their built in desire to make music. Learning to play a musical instrument is difficult from the get-go. The music notation itself is laden with theory and unnecessary cognitive barriers. Traditionally one must understand the notation and proper hand placement before even the simplest written music can be pleasing to the ears. People quickly lose interest as they see the hard work and time involved in learning just to play at a very basic level. Before the advent of digital in home entertainment it was not uncommon for individuals to spend a great deal of their leisure time practicing and studying piano or other musical instruments. In our fast paced digital world the vast majority of would be young musicians would, when given the choice, use their leisure time watching television or playing video games rather than going through the more rigorous discipline of learning to read notation, music theory and proper hand placement on an actual musical instrument.

One aim of this invention is to provide an alternative learning style that combines the fun and entertainment of modern video games with the teaching of specifics like actual finger placement, rhythm, timing and sight reading of notation. Not only would a user have fun playing the game, but she would also be able to develop skills that can be used on a real instrument; an aim of the invention is to enable the user to play real music, on real musical instruments, reading real notation. The invention also aims to make this learning fun and entertaining, so much so that a user could see it as a video game competition that draws on one's inner desire to make music. This is in contrast to the hard work of learning standard music notation and theory that is normally required before one is able to make music that actually sounds pleasant. Klavarskribo is an alternative music notation that was introduced in 1931 by Dutch inventor Cornelis Pot. Klavarskribo differs from conventional music notation in a number of ways and is intended to be easily readable. The stave on which the notes are written is vertical so the music is read from top to bottom. On this stave each note has its own individual position, low notes on the left and high notes on the right as on the piano. This stave consists of groups of two and three vertical lines. These lines correspond to the black notes of the piano keyboard. Black notes are written on the five black lines and white notes are written in the seven white spaces between the lines. Therefore sharps and flats are no longer needed, as each note has its own place in the octave. The evident correspondence between the stave and a piano induced Pot to use the name Klavarskribo. The Klavarskribo notation is a universal notation which can be used for all instruments and for singing, but it is at its greatest advantage with instruments where a number of notes have to be played simultaneously.

With Klavarskribo notation duration and rhythm are shown graphically. A piece of music is divided in bars of equal length, which are subdivided into "counts" or beats. Short horizontal bar lines show the division between the bars, dotted lines indicate the counts. All notes are provided with stems (stems to the right: play with the right hand, stems to the left: left hand). These are placed so as to indicate in the measuring system exactly when a note must be played or sung. A note always lasts till the next one of the same hand or part appears, unless a stop sign or continuation dot is used. Therefore there is no connection between shape or color of a note and the duration of a note. The various kinds of 'rest' signs, different note heads, tied notes and different clefs are thus rendered unnecessary. The Klavarskribo notation uses one clef: the center of the keyboard is indicated by making the lines representing C# above middle C and the adjacent D# as dotted lines, so middle C can easily be located. There are no different clefs for the left and the right hand. The Klavarskribo notation enables the player to see clearly, after a short explanation, how the notation 'works', so that a beginner can start playing immediately. The player can see exactly which note or chord to play and which hand to use.

Klavarskribo notated pieces are readily available. The Klavarskribo Foundation has transcribed over 25,000 pieces and provides catalogues for the instruments piano, reed organ, accordion, (orchestra), electronic organ, keyboard and guitar. Klavarskribo is not only for beginners; even difficult pieces by Chopin and Liszt are available in the Klavarskribo notation. KlavarScript™ is a PC-based software program that enables music in the traditional notation to be transcribed to the Klavarskribo notation through midi files or after scanning it in or playing it in through an electronic keyboard.

Currently there exists an industry standard referred to as Musical Instrument Digital Interface (MIDI). The MIDI standard enables electronic musical instruments such as keyboards, computers and other electronic equipment to communicate, control and synchronize with each other. MIDI allows individual components to exchange system data. For example, a MIDI-enabled keyboard transmits event messages such as the pitch and intensity of musical notes to play, control signals for parameters such as volume, vibrato, and panning, cues, and clock signals to set the tempo. As an electronic protocol, MIDI has achieved widespread adoption throughout the industry. MIDI is common to most computers, cell phones and many electronic products from companies such as Microsoft, Apple, Nokia, Sony, Yamaha and hundreds more consumer products companies.

The technology that allows a multitude of electronic products to communicate and work together in concert is in place now within most homes. Devices are available using digital signal processors that can transmit voice or any musical instrument in MIDI format. Touch sensor technology can transmit electronic signals that communicate things such as pressure and spatial relationships. Broad band internet communications are now the in home standard and enable multiple users to hook up together on line and compete in high tech video games on their personal computers. This ability to network online with others of similar interests only enhances the video game experience. Video and audio files can be easily created and shared allowing users to share their creations and performances. Computers can assess and grade the accuracy of how a notated music piece is played with instant feedback to the user. In short there exists a myriad of technologies today that can enhance and encourage the video game experience. By linking this rich gamer experience and the built in human desire to create music with actual music instruction it becomes easy to put in the actual practice time required to develop real musical talent. The invention forges a powerful connection between the hands and eyes and enables people to experience joy in their own power to make music.

SUMMARY OF THE INVENTION

A system, comprising means for receiving a first input from an electronic device, said first input pertaining to performance of music by a user, means for receiving a second input, said second input pertaining at least to music intended to be performed by the user, and a comparison module software executing on a computer and adapted to receive said first input and to receive said second input, is disclosed. According to the invention, the comparison module compares the first input from a user to the second input to produce at least one indicia of the user's success in performing the intended music correctly, and sends to a display module associated with the user information including at least the music intended to be performed by the user and the indicia of the user's success in performing the intended music correctly. Furthermore, the comparison module also sends to the display module associated with the user a timing signal suitable for indicating the speed at which the music should be shown on the display and played by the user, said timing signal computed according to one or more tempo modes selectable by the user.

In another embodiment of the invention, a method for conducting a musical computer game is disclosed. According to the method, a first input is received from an electronic device, said first input pertaining to performance of music by a user, and a second input pertaining at least to music intended to be performed by the user is received, and the first input and the second input are compared and at least one indicia of the user's success in performing the intended music is computed. Information including at least the music intended to be performed by the user and the indicia of the user's success in performing the intended music correctly is then sent to a display module associated with the user, and a timing signal suitable for indicating the speed at which the music should be shown on the display and played by the user is computed according to one or more tempo modes selectable by the user and sent to the display module.

BRIEF DESCRIPTION OF THE DRAWING FIGURES

DETAILED DESCRIPTION

The inventor provides, in a preferred embodiment, a system that enables a user to quickly learn to read and play musical notation that requires no prior knowledge of music theory. The invention quickly forges a connection between a player's eyes and fingers using an interactive scrolling interface. An embodiment of the invention allows the user to learn proper finger and hand placement while at the same time following a scrolling notation on a computer monitor. Feedback is supplied continuously via the scrolling mechanism and optionally other audio and visual feedback means. Variations are available such as a learning mode, performance mode, arcade mode, record mode, live mode, head to head competition mode and a dueling mode. One embodiment of the invention keeps a score to grade accuracy and quality of play. Multiple users, both on site and online, can access the invention allowing performances and competitions. The use of a MIDI-enabled keyboard is but one embodiment of the invention. Other embodiments utilize a digital signal processing device to convert sound or finger or hand movements to a digital signal that the invention can compare to the scrolling notation and judge for accuracy in order to provide continuous feedback to the user.

Throughout this document, reference is made to the use of the MIDI standard for passing information about music from one device or software module to another. MIDI is ubiquitous, but it is not the only way to pass such data, and any references to MIDI should be understood to mean "MIDI or any other protocol that represents pitch and duration information, at a minimum, of musical notes". The present invention should not be considered limited to embodiments in which MIDI is used, but since MIDI is so widespread it will be the only such protocol referenced in this document.

Many of the descriptions of embodiments of the present invention make reference to software functional elements of modules. It should be well understood by one practiced in the art of software development that there are many functionally equivalent ways of packaging software code. For instance, the software elements of the present invention could be implemented in an object-oriented architecture using languages such as Java or C++, or it could be implemented in a language such as C, with code divided into numerous source files. The representations herein are functional in nature, and are intended to allow one practiced in the art to understand the present invention sufficiently that he could build it in one or more of the ways just described. Accordingly, embodiments obtained by combining or dividing "modules" described below, without changing the functional arrangements described herein, should be understood to be within the scope of the present invention.

Figure 1:
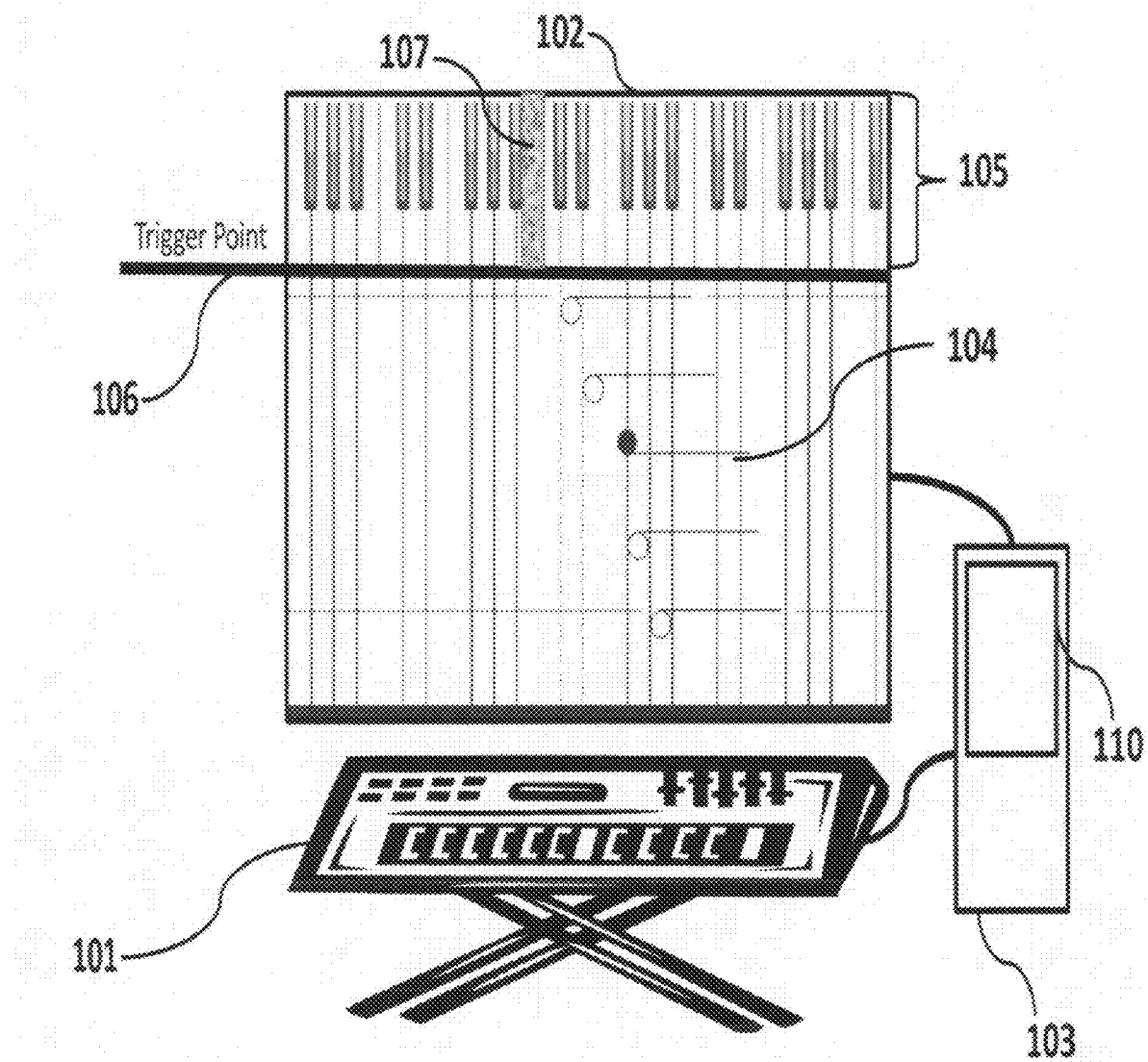
FIG. 1 is a drawing of an embodiment of the invention comprising a MIDI-enabled keyboard, a personal computer, and a monitor displaying scrolling Klavarskribo notation with a keyboard image on top.

FIG. 1 is an illustration of an embodiment of the invention using a MIDI (Musical Instrument Digital Interface) equipped keyboard 101. The keyboard can be a standard 88-key MIDI piano keyboard, or a smaller MIDI-enabled keyboard; many varieties of MIDI-enabled keyboards are available on the market. The keyboard 101 is for illustrative purposes; according to the embodiment any MIDI-enabled musical instrument can be used. The MIDI-enabled instrument 101 is used for input from the player, who plays music as it is displayed on a monitor 102. The monitor 102 can be a standard computer monitor such as a 19-inch flat panel display, but it is not so limited. For example, monitor 102 could be a flat-panel display embedded in the casing of the MIDI-enabled instrument 101.

According to a preferred embodiment of the invention, a scrolling musical score 104 is displayed on monitor 102. In an embodiment of the invention the scrolling musical score 104 is based on the Klavarskribo system of notation, although the invention is not limited to this notation schema. According to the embodiment, at the top of monitor 102, a keyboard image 105 is displayed. The keyboard image 105 and the score 104 are aligned such that the lines corresponding in Klavarskribo notation to black notes are aligned with the corresponding black notes of the keyboard image 105. With this alignment, when notes in the score 104 move upward, they eventually reach the keyboard image 105 and are aligned vertically with the key represented by the note. It will be appreciated that, if another notation system other than Klavarskribo is used, the visual correlation between notes in a score 104 and notes on a keyboard image 105 will be more complex; what is important is that, according to the invention, a player is provided real-time visual feedback as they play, and is provided the ability to look ahead in the score 104 to see what is to be played next. MIDI-enabled instrument 101 is connected, via MIDI cables or USB or any other suitable connection capable of passing MIDI data from the instrument, to a personal computer, laptop, or other computing device 103. Software 110 of the invention executes on the computer 103 and receives input from the MIDI-enabled musical instrument 101 as a player plays. Software 110 processes the MIDI input as will be described below, and feeds a video signal to monitor 102 which contains the score 104, the keyboard image 105, and visual feedback elements corresponding to the player's input.

According to an embodiment of the invention, a player selects a piece of music to play, whether as part of a game mechanic, for practice, or for performance. The beginning of the music's score is displayed, in Klavarskribo or other suitable notation, on the monitor 102, and begins scrolling upward according to the tempo of the music. As each note 104 of the score reaches the top of the screen, where the keyboard is located, the player (hopefully) plays the note, holding (maintaining the note by keeping the key depressed, or as appropriate for the MIDI-enabled instrument 101 being played) for as a long as is indicated by the score. Visual feedback is provided for example by the keyboard image keys corresponding to notes played by the player being changed in color to (for example) green for correct notes, red for incorrect notes, and yellow for notes that should have been played but weren't. Shaded key 107 is an example of visual feedback, indicating that the key 107 was correctly played (if green) or not (if red). Choice of colors, shapes, or animations for feedback should be understood to be outside the scope of the invention as such; any set of colors, shapes, and animations that is pleasing to a designer can be used without departing from the scope of the invention. Audio feedback, such as a buzzing sound for incorrect notes, can also be provided. It will be convenient to refer to the point on the screen that signifies to the player "play here" as a trigger point 106. In preferred embodiments, audio feedback in the form of music is also provided to users, who may elect to turn off musical feedback, or some parts of musical feedback or not. In some embodiments musical feedback is simply the music played by a user, which can be played back as piano music or some other musical sound (many MIDI-capable keyboards in the art are adapted to play back one of many musical instruments in response to input from users). In other embodiments, only correct notes are played when a user plays them, with wrong notes being silent or, as above, being indicated by provision of a negative audio feedback signal such as a buzzing sound. In yet other embodiments, and particularly when users are at an early stage of developing proficiency (perhaps focusing solely on playing a melodic line correctly), musical feedback in the form of harmonic or rhythmic accompaniment to a user's playing is provided. In an embodiment, a user is provided notation to play a single part from an orchestral score, and the rest of the orchestral parts are played by the system as accompaniment, allowing a player to experience (while learning how to play) the sense of "being in the orchestra". In the embodiment just described, the trigger point 106 is the bottom of the keyboard image 105.

Figure 2:
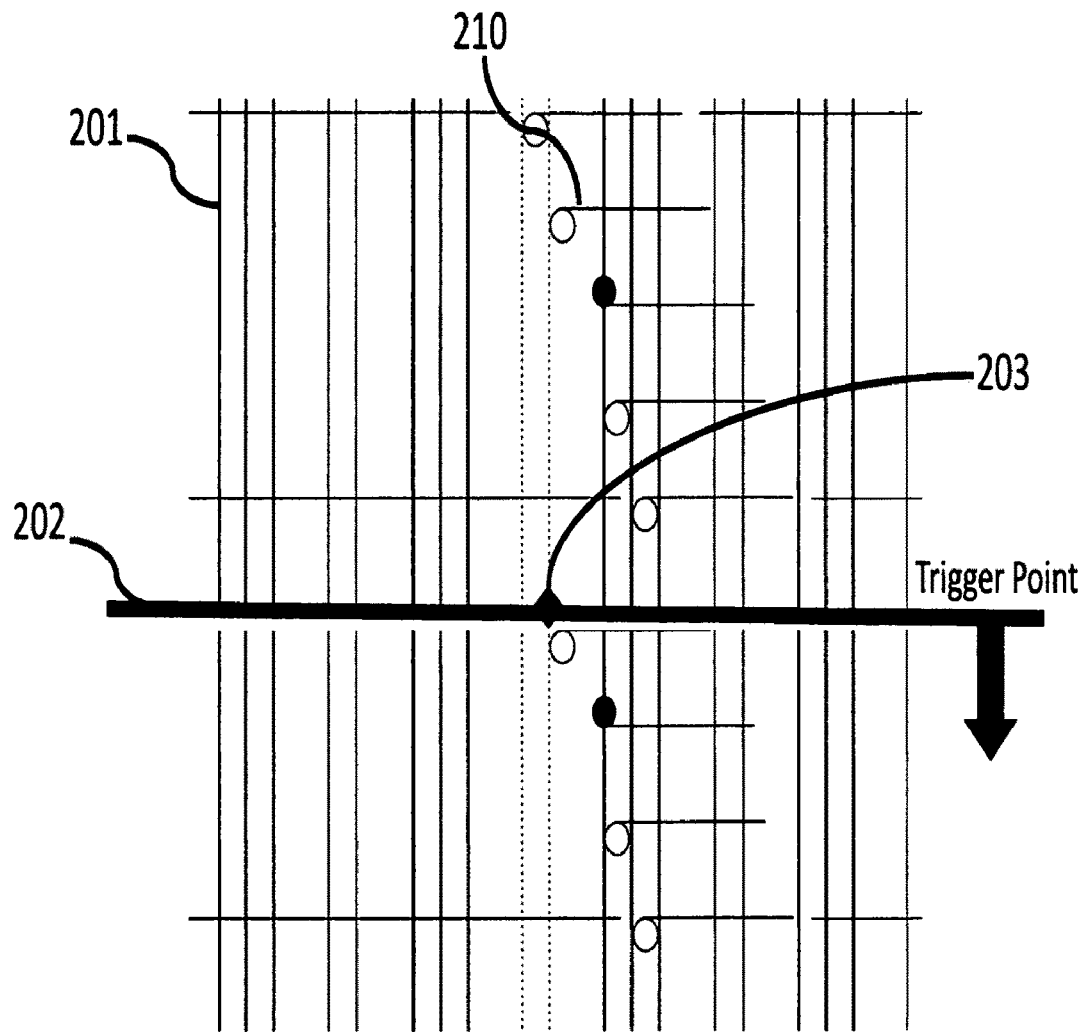
FIG. 2 illustrates an alternative method of providing visual feedback according to the invention.

FIG. 2 shows another embodiment of the invention with a different layout of the visual display shown on monitor 102, and a different trigger point 106. In this embodiment, Klavarskribo notation 210 does not scroll or move, but is displayed as a stationary element. A timing bar 202, which optionally can include a keyboard image, moves according to the tempo of the music, rather than the notation moving. The timing bar 202 also acts as the trigger point in this embodiment; as timing bar 202 moves over notes 210, the player is supposed to play those notes (again, holding them as indicated by the score 201). As above, visual feedback can be provided to the player by adding feedback elements to the timing bar 202. In FIG. 2, an example of this is illustrated by the diamond-shaped error feedback 203, which shows a player that an incorrect note was played (in this case, the E-flat above middle C was played instead of the E that was supposed to be played). Notes above the timing bar 202 are notes that are, or should have been, already played. They may be omitted if desired, or retained to facilitate a player's understanding of the musical piece as a whole. After the timing bar 202 passes, the appearance of notes can be altered as well, for instance by graying already-played notes out. Alternatively, the visual feedback colors could be retained so that, after playing a piece, a player or teacher can review the player's performance in detail.

The method of display shown in FIG. 2 allows for the static display of music in paginated form, if desired. In embodiments using Klavarskribo notation, this may be accomplished by having a second horizontal scrolling line, which represents a divider between a current page and a "next" page. As the timing bar nears the bottom of a screen of Klavarskribo notation, a second bar could appear at the top and, above it, the next page of music, also in Klavarskribo notation, can be shown. In this way, by the time a player reaches the bottom of a page of notation, the next page will already be substantially visible and play can continue seamlessly. In another embodiment, pages of Klavarskribo notation can be displayed side-by-side on a screen (generally although not necessarily with a correspondingly reduced keyboard image 105 at the top; where maintenance of a full-sized keyboard image is desired, a zooming effect can be provided where, for example, as notes from the current page of notation reach the timing bar, they visually "fly" to the appropriate key on the keyboard image 105). When one page of notation is finished, the right hand page can be switched to become the left hand page and a subsequent page of music can then be displayed in its place on the right; alternatively, both pages can be kept visible until completed and then replaced together when the second one is finished. In another embodiment, paginated display is used with "normal" music notation instead of Klavarskribo; in this embodiment, timing bar 202 would be vertical and would move to the right through the score according to the desired tempo. Again, it is emphasized that the display mechanisms described are merely exemplary in nature; there are numerous ways of arranging the display of notes that should be played and the notes that are played, along with visual feedback elements.

Figure 3:
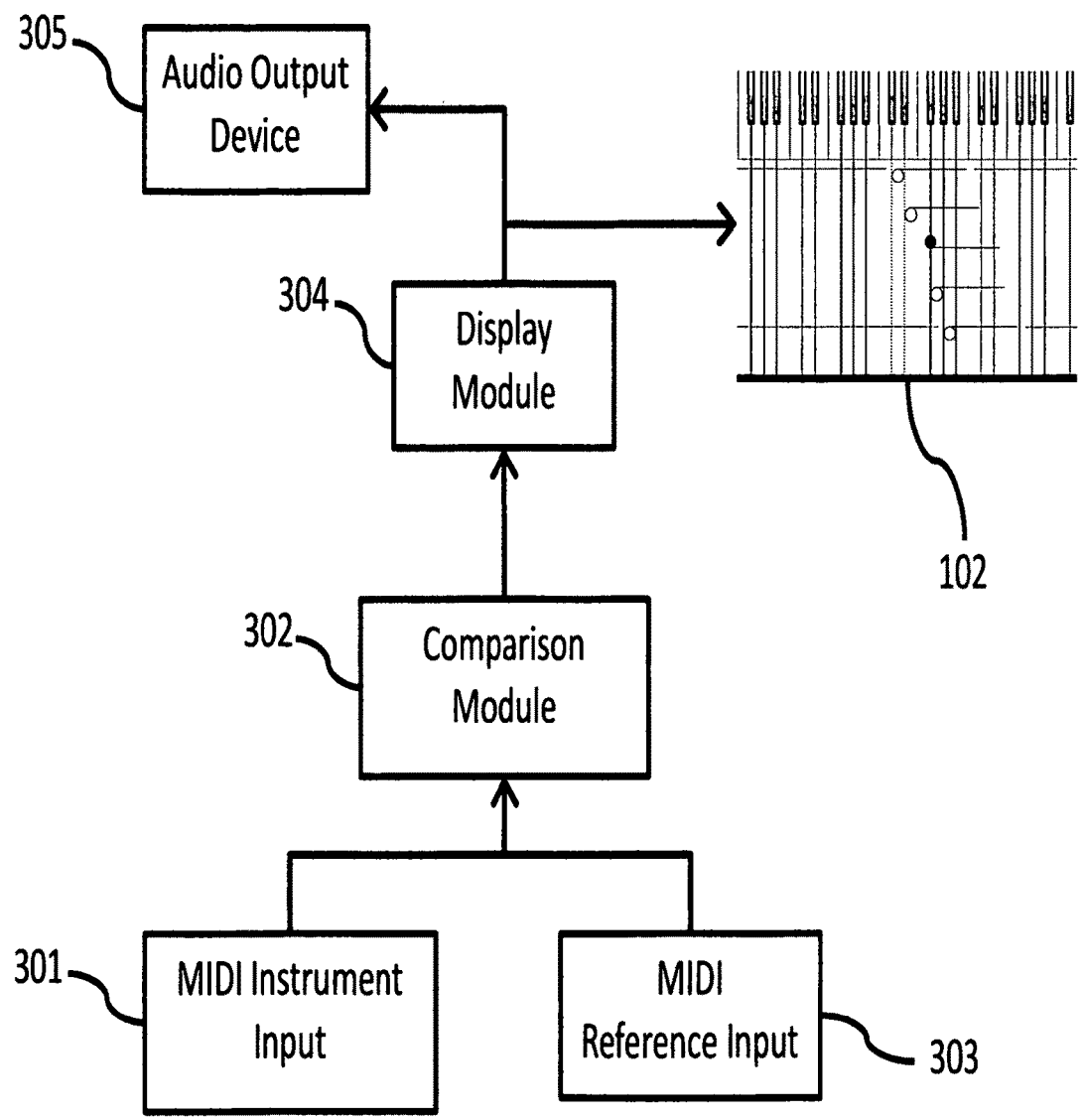
FIG. 3 is a block diagram of the logical elements of an embodiment of the invention.

FIG. 3 provides a block diagram of the logical elements of the invention, according to an embodiment. A MIDI input element 302 obtains input from a MIDI source, such as the keyboard 101 of FIG. 1. As a player plays music, the notes played are collected by MIDI input element 301 and passed, in MIDI format, to comparison module 302. MIDI file input 303 is also provided to comparison module 302. In a preferred embodiment, when a player chooses to play a particular musical selection (or when it is assigned to him by game logic), the entire piece is loaded from a MIDI reference input source into comparison module 302. This is not required, however. MIDI reference input 303 could feed MIDI data concerning a piece in real time (i.e., as notes are to be played), in blocks of data (for instance, one minute of music at a time), or alternatively many musical selections could be stored in memory in comparison module 302 after initial loading from MIDI reference input 303. What is important is that the MIDI reference input 303 represents the music as it should be played; it is the reference against which the player's input (playing) will be compared, tested or scored.

In an embodiment, the MIDI reference input 303 data is traversed within comparison module 302 at a fixed "speed" or "tempo"; that is, a uniform time step (which changes only when reference tempo changes) is used and MIDI reference data is sampled each time step to determine what should be played during that time step. A common way of implementing this, but not the only way, would be to have timer events fire at a regular interval, for instance every millisecond. As each timer event fires, MIDI reference input 303 data is sampled and the required notes (those which should currently be "active", or being played by the player) are determined. Each time a player plays or releases a note, a MIDI event is generated and sent from MIDI instrument input 301 to comparison module 302, where it can be compared to the current required notes. Comparison module 302 sends data concerning what notes are required to display module 304. Since it is important for a player to be able to look ahead to notes that are to be played in the future, as is common with printed scores (where the player can see one or two pages of music at a time), comparison module 302 typically will send data for a predetermined period of time or a fixed number of measures, which may vary during the course of a given piece to best accommodate ease of play (this would be done by the publisher of a particular piece of music according to an embodiment). Also, when a visualization screen is "zoomed" in or out, a corresponding increase (when zooming out) or decrease (when zooming in) of the timeframe which the screen can represent occurs, may make it desirable for comparison module 302 to send more or less data, accordingly. Comparison module 302 compares data concerning notes actually played (received from MIDI instrument 301) to reference data concerning what should have been played (received from MIDI reference input 303) to determine if the player played what was required. It should be clear that there are at least two key dimensions to be checked: were the correct notes played, and were they played at the right time (and held for the appropriate length of time). Comparison module will typically, but need not, use configurable variance thresholds in determining the accuracy of a player's performance. For instance, few players other than true experts play notes exactly when they should; comparison module 302 therefore counts any notes played within allowable time variance from the target time (the time when the applicable note crosses the trigger point) as being correctly played notes. Higher values of the timing variance threshold will allow a player to more loosely follow the timing of a piece while still being assessed as playing accurately. In another embodiment, instead of using a variance level for binary satisfactory/unsatisfactory rating of each note, a continuous variable such as a percentage "ahead" (early) or "behind" (late) measure, comparing an actual play time for a note with an expected or correct play time for the note, can be used. Such continuous measures are suitable for varying levels of "goodness" of playing, such as "GOOD", "GREAT!", "PERFECT!!", or "Needs Work . . . ". The situation is different for accuracy in the sense of playing the right key. With keyboards, there is no ambiguity about which key is pressed, especially when MIDI interfaces are used. However, it is often true that while a correct key is played, an incorrect adjacent key might also very briefly be played by an inexperienced player. It may be desirable to ignore this incorrect key in scoring or teaching if the time it is pressed is very short; thus a configurable minimum time threshold may be set and used by comparison module 302. While such a threshold can be set as a fixed value within the scope of the invention, it is more advantageous to make such a threshold a fraction of the length of the intended note. For example, if a player is supposed to play an eighth-note middle C and does so, but also plays the D above middle C for a time equivalent to less than 10% (this is configurable) of the length of the middle C, then the D would be ignored. But if the D is held for a longer time, it would show up as an incorrect key played on monitor 102 (and the middle C would show up as correctly played).

According to an embodiment of the invention, data is passed from comparison module 302 to display module 304 as a fixed set of data at a fixed periodicity. This would typically include a list of all notes currently being played or that currently should be being played, with appropriate attributes to inform the display module 304 of the status of each such note (for example, middle C is active and correct, the D above it is active and incorrect, and the E above that should be active but is not). Additionally, comparison module 302 would pass a current position in the score that corresponds to the current notes data, and would periodically pass a buffer full of future notes to be played so that the display module would always have enough data to display a full screen even at a (configurable) maximum zoom outward. Zooming outward, which can be triggered by a user by an optional zoom button, menu option or keystroke, means to move the player's point of view out from the page, encompassing more musical time at one glance but making all details correspondingly smaller; at maximum outward zoom a maximum amount of music (and time) is shown on the monitor 102, so display module 304 must have at least enough data from comparison module 302 to show this amount of music. Note that in some embodiments the size of the musical notation system, keyboard and so forth is zoomed as with any typical "zoom button", but in other embodiments, only the time factor is zoomed, meaning each event is spaced more closely together vertically (or horizontally, if using traditional notation), while other screen elements retain their normal sizes. Normally, comparison module 302 only deals with what is played, and what should be played; the determination of how feedback is to be provided to a player is made by display module 304, and a corresponding video signal is sent to monitor 102. Optionally, audio feedback may be provided to audio output device 305, which in some embodiments is a computer's internal speaker, an external speaker or set of speakers connected to a computer by USB, audio cables, Bluetooth™, or the like, or any other audio device adapted to receive data from a computer (e.g., computer 110) directly or via monitor 102 (many monitors have audio output plugs and can pass through audio received from a computer).

Display module 304, on receiving data from comparison module 302 concerning what notes are to be played, and concerning what notes actually have been played, performs calculation needed and sends video to monitor 102 and, optionally, audio output device 305. Several calculations are needed in display module 304. For instance, when a player changes the zoom level for display of music, via a menu option, a button in the user interface, or a keystroke (methods of passing commands to a personal computer or video game console are well-known in the art and any of them can be used without limiting the scope of the invention), display module 304 must calculate how many notes, at the new zoom level, must be sent to the monitor 102. Similarly, the rate at which the musical score scrolls on the monitor 102 must be recalculated each time the tempo of a piece changes. The scroll rate is determined by the zoom level (number of beats per unit of height on the monitor 102) and the tempo (how fast beats must arrive at the trigger point 106). And, during complex musical passages where many notes of small duration must be displayed, display module 304 may determine that measures must be expanded (fewer beats per unit of height), and this will also lead to a change in scroll rate. In some embodiments, users are provided with an option to allow the system to make these adjustments automatically when deemed necessary or, optionally, to mark passages for zooming manually (ahead of time or during play). When manual zooming choices are made, in some embodiments they can be saved, either in a new music file or as a revision of the original music file; advanced players will tend to thus customize their files to suit their playback and notation preferences.

Figure 4:
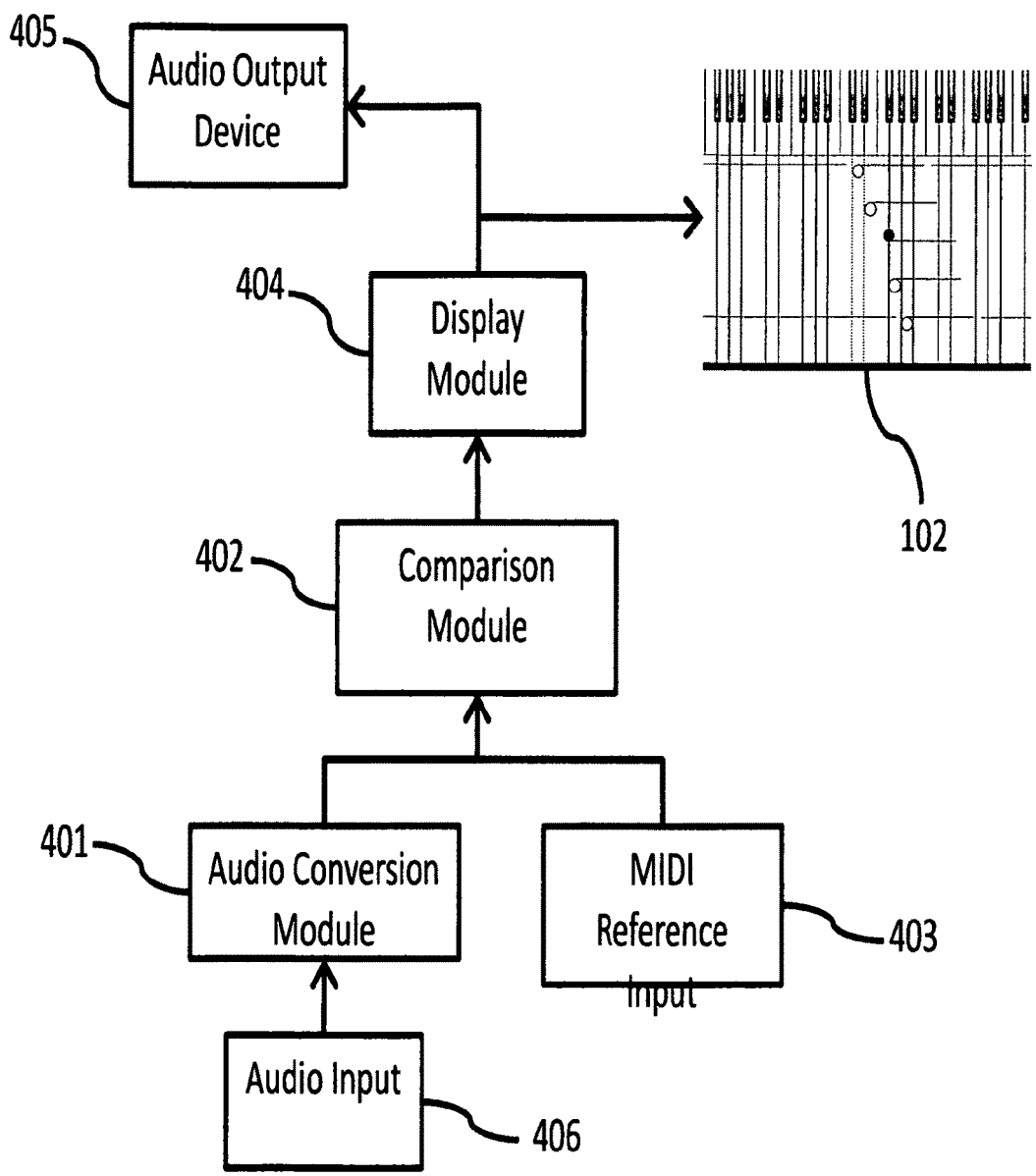
FIG. 4 is a block diagram of the logical elements of another embodiment of the invention, in which audio input is converted into MIDI input.

FIG. 4 shows another embodiment of the invention, in which an audio input device 406 is used, instead of a MIDI-compatible musical instrument, to capture a player's music play for comparison to the musical score provided by MIDI reference input 403. Audio input device 406 can be an external microphone, a built-in computer or game console microphone, or any other device capable of capturing sound and rendering it, in digital or audio phone, as an electronic signal. The audio signal is passed to an audio conversion module 401, which converts the audio stream into a MIDI output. To do this, audio conversion module must detect each new played (or sung) musical note from within the audio stream, and identify its pitch and volume, and the times of its beginning and end. With these elements known, audio conversion device 401 can deliver MIDI events of the form (note X started at volume Y, at time Z) or (note X ended at time Z) to comparison module 402. Audio conversion device 406 can optionally provide additional music-related information to comparison module 402, for example providing pitch error data, which can be very useful for vocalists, violinists, and other musicians who need to control the pitch of their music very carefully. When this pitch error data is made available, visual feedback may be provided, in a form such as a slide bar that shows how sharp or flat a given tone is, by display module 404 on monitor 102.

The use of an audio input device 406 and subsequent MIDI conversion in audio conversion module 401 enables any musical instrument, or a vocal part, to be practiced and trained (or to compete when treating the invention primarily as a game) according to the invention.

The tempo (or pace) of music is very important, and the present invention is adapted to train players not only on what notes to play, but also on rhythm and tempo control. The inventor envisions several tempo modes. In "normal mode", a tempo setting is included as part of the MIDI input (this is a standard MIDI feature) and is passed by comparison module 302 directly to display module 304 to enable the display module to control the rate of scrolling of the musical score, as described above. When changes in tempo are indicated in a MIDI input, the changes are passed to display module 304 so it can automatically change the scroll rate when the new tempo takes effect (when the tempo change arrives at the trigger point 106). In some embodiments, users are provided with a button for selecting a different tempo for a piece, or for a section of a piece. Changes can be made in qualitative terms (for example, "much faster", "faster", "slower", or "really slow"), or in quantitative terms (for example, "play at 75% of the indicated tempo", or simply "replace MIDI settings with a setting of 120 beats per minute"). Such changes can be made for a single play session, or in some embodiments they can be saved by a player, either as a new file or as a modified version of the original file.

Figure 5:
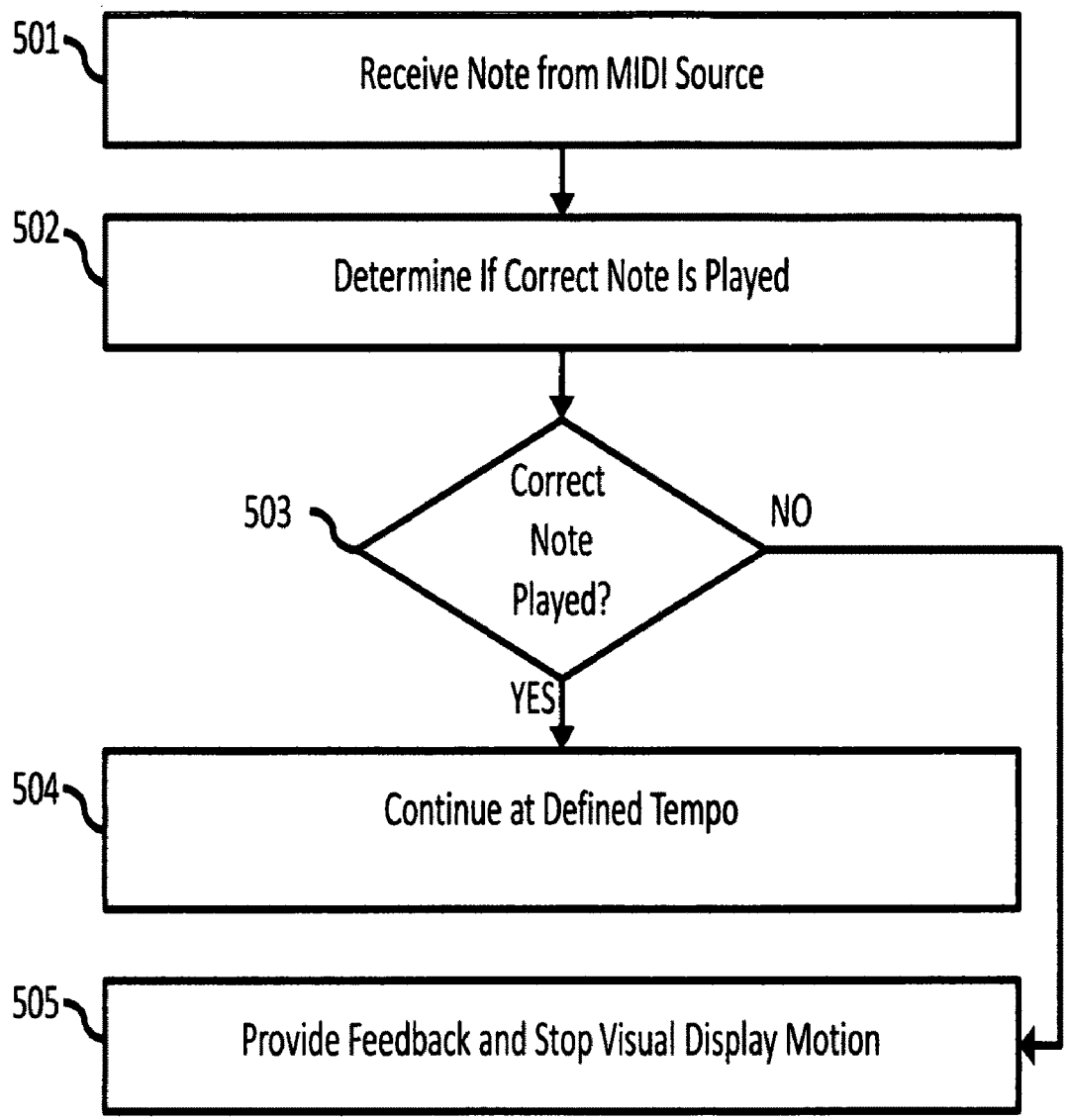
FIG. 5 illustrates a method according to the invention for providing a teaching rhythm mode.

FIG. 5 shows a method for providing a "teaching mode" of tempo control. A goal of this mode is to encourage a practicing player to correct mistakes by not letting the player advance (move further into a piece of music) until she gets each note right. In step 501, a note is received (in comparison module 302) from either a MIDI instrument 301 or an audio conversion module 401. In a second step, the note is checked against data from MIDI reference input 303 which indicates what the player should be playing. In step 503, a branch is executed based on the comparison in step 502. If the correct note was played, play continues in step 504 at the defined tempo. In this case, play continues until a new note is played by the player. If the comparison step 502 failed, then in step 505 feedback is provided to the player and the motion of the visual display is stopped. Once either step 504 or step 505 is executed, the method starts over when the next note is received from the player (step 501). Since often, in keyboard music, multiple notes are required at once (i.e., chords), there are alternative ways according to the invention to manage this mode. In one embodiment, all of the notes required must be played simultaneously (again, as above, defined by "within a configurable time variance of each other"), or the check in step 503 fails. In another embodiment, if substantially most of the required notes are played, the test of step 503 succeeds. In yet another embodiment, a main melodic line is identified (and indicated visually on display 102), and as long as the user plays the right note from the melodic line he is allowed to proceed regardless of whether any other notes were played properly (or at all). These three types of training mode rhythm control are exemplary in nature and the invention is not limited to them only; it can readily be appreciated that other approaches could be taken to training mode to facilitate learning, without departing from the scope of the invention.

Figure 6:
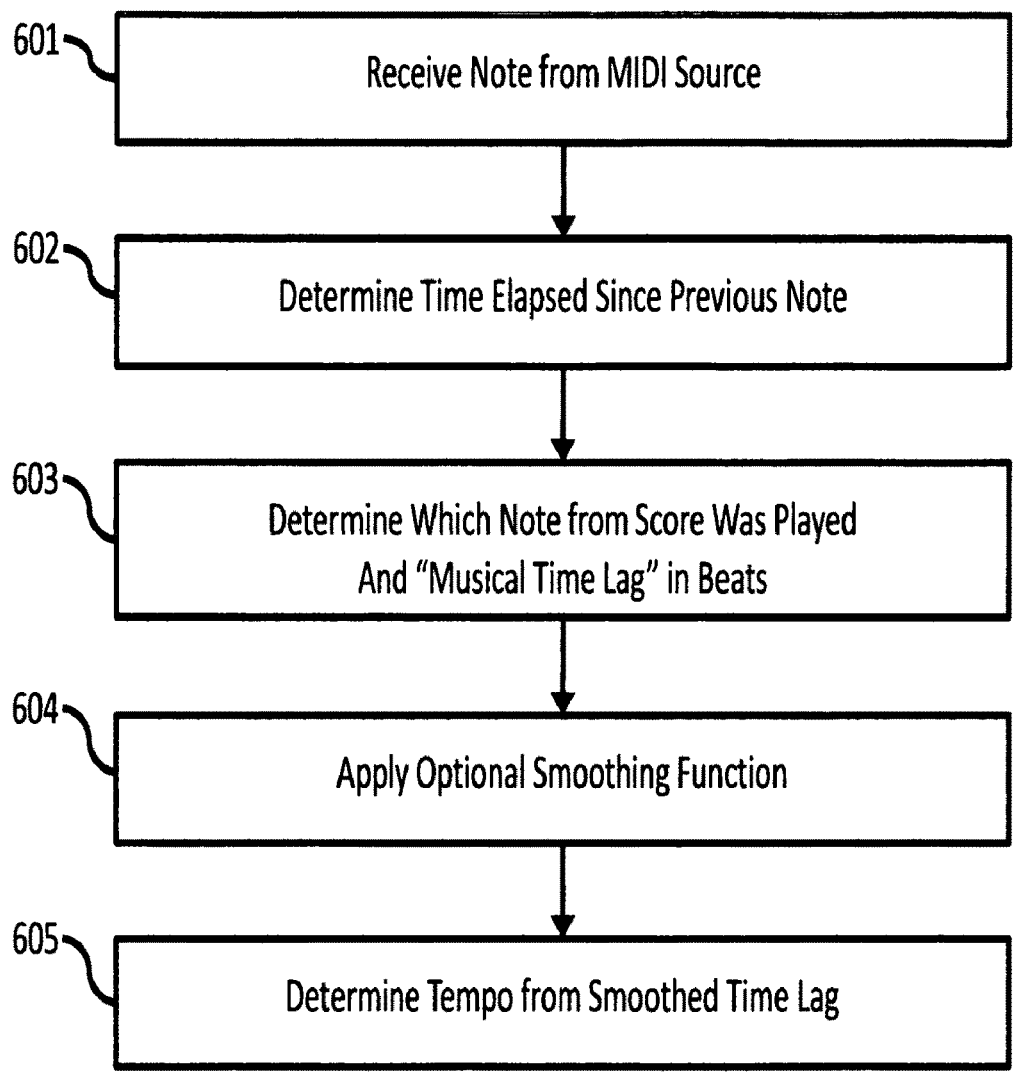
FIG. 6 illustrates a method according to the invention for providing a performance rhythm mode.

FIG. 6 illustrates a method for providing a "performance mode" that is designed to allow a player maximum freedom to perform music as desired. In performance mode, the comparison module 302 attempts to follow the performer, by determining the effective tempo at any given moment and feeding it to a display module 304, which then makes adjustments in the scrolling speed of the score on monitor 102 to match the performer's current tempo. While it might seem natural to determine the performer's tempo by simply measuring the time between the playing two known notes in a musical piece, and then dividing the musical "distance", in beats, by the elapsed time (in minutes), this will often lead to poor results because tempo so measured will tend to jump violently from one value to another as each note is played. For example, if two notes that are one beat apart are played 2 seconds apart, then the instantaneous tempo is one (beat) divided by $\frac{1}{30}^{th}$ (minute, this is how much two seconds is), or 30 beats/minute. However, such a simplistic approach leads to extremely jerky results, in a literal sense, as the tempo changes instantaneously every time a new note is played, if there is any variation in the player's rhythm. In rapid passages with many notes of short duration, very slight measurement errors or playing errors will result in very large, and very sudden, tempo excursions.

A better approach is that shown in FIG. 6. In step 601, a notification is received from a MIDI source that a player has played a note, and specifically at a certain time. In step 602, the elapsed time between the last played note and this note is determined, as described above, and in step 603 the musical distance (in beats) is determined by identifying which note in the score was played and calculating the elapsed beat count, according to the score, from the last-played note to the just-played note. Alternatively, this process can be done not for every played note, but only for notes that correspond to a beat (as opposed to notes that are played on the off-beat or at some other time), or for a statistical sampling of beats; these approaches will reduce computational load and may reduce jerkiness by sampling at lower frequencies and therefore lowering the percentage error for any given absolute time error in play. Optionally, in step 604 a smoothing function can be applied to these calculations of tempo. For example, a list of the last 10 measurements (or all the measurements taken in the last 10 seconds; these are different sampling approaches but do not change the concept or limit the invention) can be averaged to obtain a moving average that will exhibit more stable behavior. Any number of variations can be envisioned, such as doing a weighted moving average in which on-beat notes are weighted more heavily than minor passing notes (which are presumably more likely to be slightly off-tempo without signifying an overall tempo changes). This kind of variation can be particularly useful if there are many ornamental notes in a piece of music. In another embodiment, the smoothing function used in step 604 may be chosen from a set of possible functions (those mentioned above plus others known in the art for smoothing noisy data), based on the degree to which the tempo is fluctuating. For example, the volatility of the time series that is tempo can be measured easily using techniques well-established in the study of financial markets; for a given piece if this value is higher than normal a different smoothing function can be selected and its volatility measured under the same performance conditions. If volatility is reduced, then the new selection is retained; conversely if the new selected smoothing function leads to higher volatility then the original may be reverted to, or another may optionally be selected from the set. Finally, in step 605, the smoothed time lag is used to calculate the new tempo using the formula discussed above (musical distance divided by time in minutes), and passed to display module 304. It is worth re-emphasizing that the purpose of these various algorithmic choices is to more accurately track a user's position in the music. The idea is that a performer (user) should not have to adjust his tempo to what he sees on the screen. The notation is simply there to remind users of the correct notes to play, as with reading any printed notation. Accordingly, tempo determination in some embodiments is only one among several possible means of determining a user's current position in the music. Examination of what notes are being played is quite relevant, as performance mode may have to correct itself. For instance, consider a series of repeating notes; even with tempo adjustment it is possible that a user could play one or more of the notes indistinctly (or not at all, or a user could play one too many of the repeated note), leading the system to lose track of which note the user is playing, but when a non-repeated note is played, the system can then re-adjust by "concluding" that the repeated set of notes is past. These (tempo and note verification) are but examples of approaches to closely tracking a user's progress through a printed piece of music in order to keep the notation "in time" with what the player is doing, so the notation assists, rather than distracts, the accomplished player.

Figure 7:
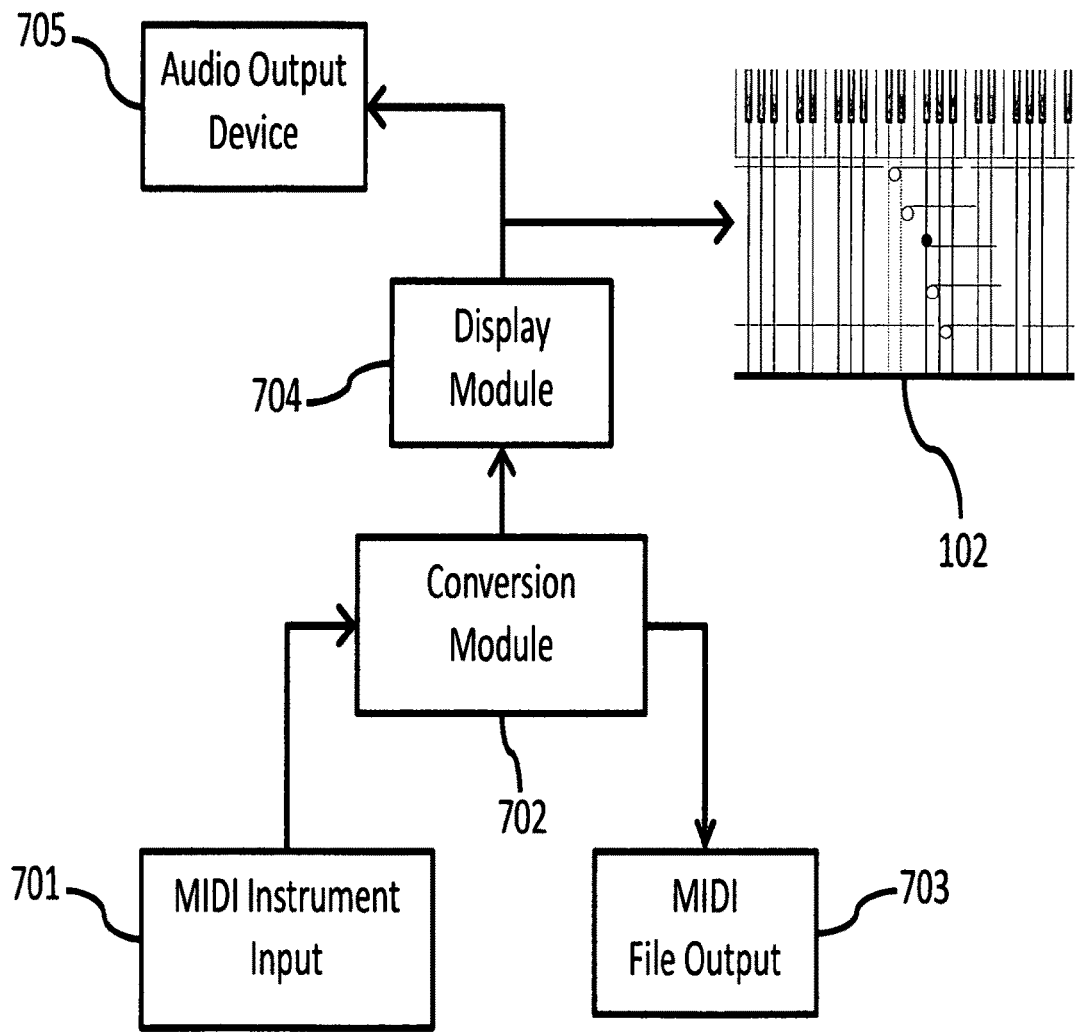
FIG. 7 is a block diagram of the logical elements of an embodiment enabling a "write mode" of operation.

FIG. 7 illustrates an embodiment of the invention in which a player's musical performance is written to a MIDI file, rather than being compared to an existing MIDI file. As before, a MIDI instrument input 701 is used to collect the notes played by a user (although an audio source 406 and audio conversion module 401 can be used as well). However, instead of feeding play data into a comparison module, in the embodiment the data is fed into a conversion module 702 which converts the raw note data into rich MIDI data that can be written to a MIDI file 703 and also passed to display module 704 to be displayed on monitor 102. Conversion module 702 has several tasks to perform, including principally tempo smoothing and determination. Tempo determination is performed within conversion module 702 using substantially the method of FIG. 6, except that without a MIDI reference input the musical distance between any two played notes is not known in advance. This can be provided manually by allowing a user to provide a meter (that is, stating whether there will be four quarter notes to a measure, or three, or five, and so forth), and a rough tempo, and then using that as a baseline and measuring variations from that baseline. Other more sophisticated methods can be used, for example treating each keystroke as an event and looking for the dominant frequency of event arrivals using well-known spectral techniques (or looking for dominant frequency within a range of typical music tempos, say 60 to 120 beats per minute, and picking that dominant frequency as the base tempo).

Figure 8:
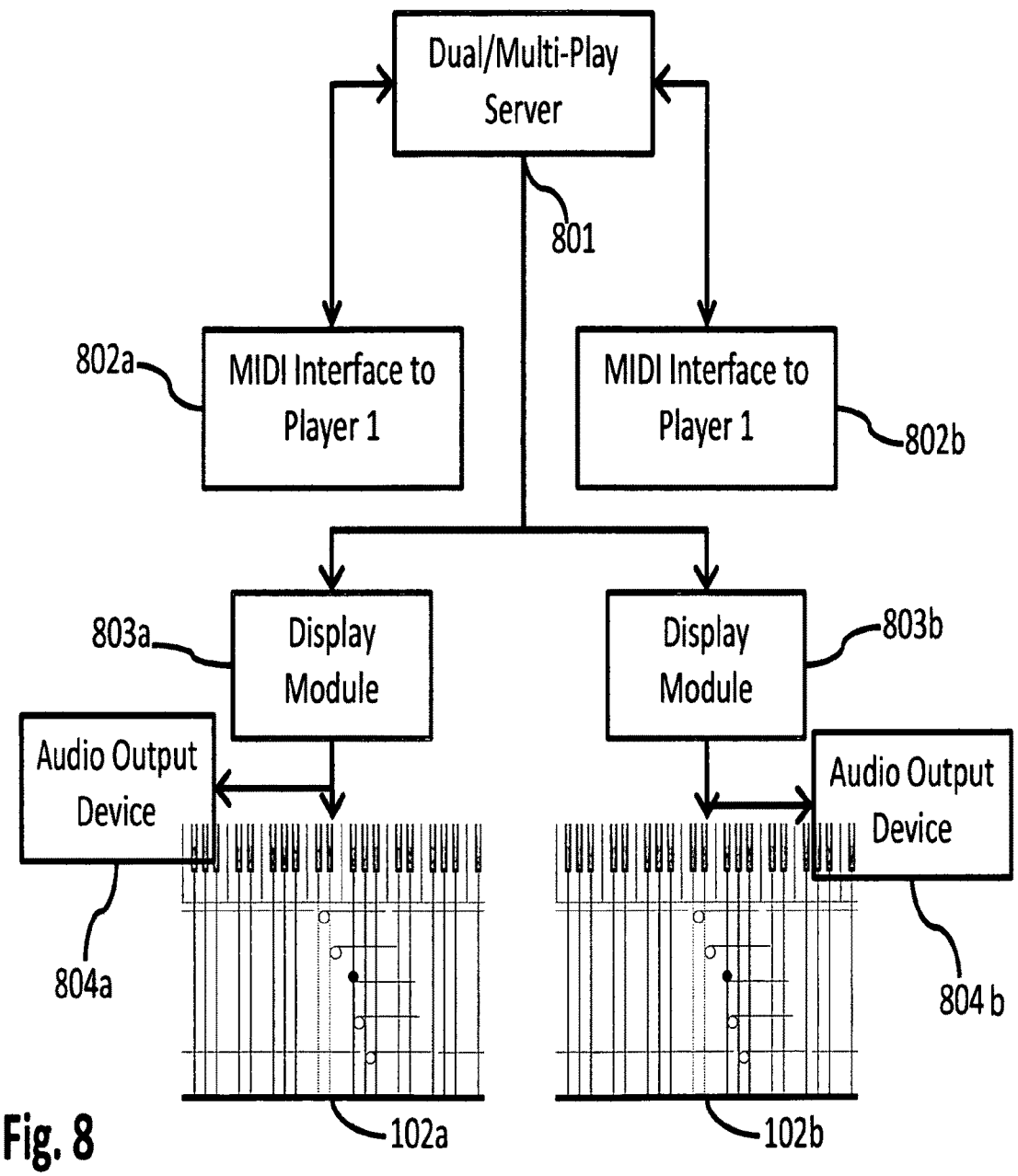
FIG. 8 illustrates an embodiment of the invention providing head-to-head play for competition or duets.

FIG. 8 illustrates an embodiment of the invention in which two or more players play together, either cooperatively or competitively. Two players are illustrated, although more can participate with similar arrangements, limited only by available bandwidth or computing resources. Each player plays a MIDI-enabled keyboard or other instrument (or uses the audio input and audio conversion module combination disclosed previously), and is connected to a dual/multi-play server 801 via a MIDI interface 802a, 802b. Server 801 comprises at least a comparison module 302, a MIDI reference input 303, and one or more display modules 304. As with single-player embodiments, MIDI reference input 303 provides the notes that are to be played by one or more of the players, and these are passed from server 801 to display modules 803a and 803b exactly as before, and display modules 803 format the data for display on monitors 102a and 102b. Each player may select her favorite visualization style, for example the Klavarskribo style of FIG. 1 or of FIG. 2, or standard musical notation style.

The inventor envisions various modes of multiplayer play. In one embodiment, two or more players take turns playing the same piece or segment of music, and strive to get the highest score. Scoring is done by measuring, in the comparison module 302, one or more of how many correct notes each player played, how many incorrect were played, how consistently tempo was maintained, how many required notes were omitted, and so forth. Players can view their scores on monitors 102a, 102b, and so forth. Music can be used of varying difficulty levels to accommodate players of differing skills. In another embodiment, players take the lead in turns, each leader playing a segment of music of her own devising (which would be provided on screen to the other player, or in an alternate game mode would not be so the following players' memory is tested). Alternatively, a musical selection with several distinct parts is used, with each player taking each part in turn, the players competing for the highest overall score after each has cycled through all parts. It will be appreciated that there are many game variants that are possible other than those exemplary ones described herein, without departing from the scope of the invention.

Server 801 may be collocated with both players, for example when all components are loaded onto a single computer or gaming console capable of supporting multiple players. Alternatively, server 801 may be located with one of the players, and the one or more other players are connected from local or remote computers or consoles via a network such as a local area network or the Internet. When players are located at some distance from each other, or when they are connected over an unreliable network, it is possible that latency problems will hinder the competitive (or cooperative) musical play experience. Server 801 can optionally measure network latency by pinging the remote devices (which is well know in the art), and can do so on a regular basis to monitor network latency trends over time. Knowledge of network latency is useful in calculating scores, as each arrival time of a note from a player can be adjusted by server 801 based on the measured latency to that player's location.

Figure 9:
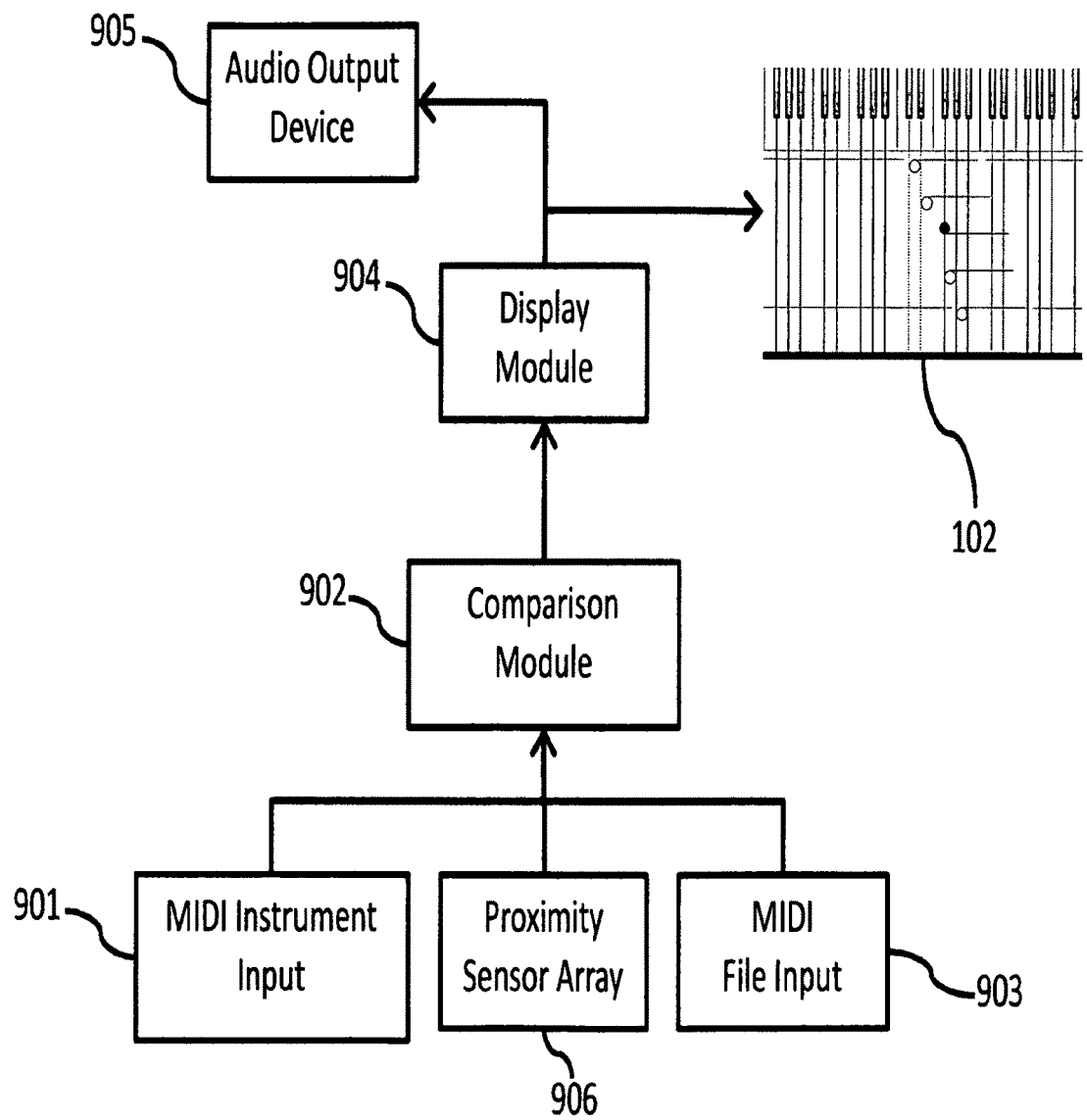
FIG. 9 illustrates an embodiment of the invention that uses proximity sensors to provide hand or finger position feedback.

FIG. 9 illustrates an embodiment of the invention that provides feedback not only on what a player has played, but also on what a player is about to play. This is accomplished by detecting hand or finger positioning passively and using this information, via visual display on monitor 102, to inform a player when his hands or fingers are correctly (or incorrectly) positioned, before notes are played. For instance, when a keyboard player needs to move her hands to a new position to hit a note that is separated from the previous note, it is often necessary (especially for less experienced players) for the player to glance down at the keyboard to ensure her hand is properly positioned. This switching from reading the score on monitor 102 and checking hand position on keyboard 101 detracts from a player's ability to stay focused. It would be clearly preferable for players to get immediate feedback on hand position or fingering in advance of playing notes, because not only does it allow for fixing positioning problems before they lead to wrong notes' being played, but it also allows a players to focus solely on displayed information on monitor 102 while playing.

To accomplish this passive hand or finger position feedback, proximity sensor array 904 is added to the system shown in FIG. 3, as shown in FIG. 9. Proximity sensor array 906 is an array of sensors or detectors that determine when a finger is in close to proximity to any given key. Various kinds of proximity sensors are readily available in the art, including but not limited to infrared sensors, real-time video processing software, lasers that reflect off of fingers coupled with detectors for picking up reflected laser light, or pressure sensors that can pick up contact pressure that is less than what is required to play a note but is still detectable. Alternatively, virtual reality gloves, or gloves with small RFID or other passive sensors on the fingertips, can be used to detect hand and finger location. Output from proximity sensor array 906 is fed to comparison module 902, which performs the same functions as comparison module 302 in FIG. 3. While detecting proximity of a finger is useful, it is often important to know which finger is hovering above a key on a keyboard, as one of the important things an aspiring musician needs to learn is proper fingering. Since comparison module 902 typically receives multiple indications of finger proximity, comparison module 902 is adapted to interpret the spatial pattern of finger positions to determine which fingers are where with good accuracy. For example, if proximity sensor array 906 notifies comparison module 902 that fingers are close to middle C and the four notes above it, and another group of finger proximity indications is received from the G an octave and a half above middle C and the A, B-flat, and C above it, then comparison module can estimate that the fifth (pinky) finger of the left hand is on middle C and the thumb of the left hand is on the G above middle C, and that the thumb of the right hand is on the G an octave above that. Note that in this example there is some ambiguity because either the fourth or fifth finger of the right hand is likely on the C two octaves above middle C; it is helpful for even an approximate sense of where the players hands and particular fingers are to be provided as visual cues back to the player, so this ambiguity is not disabling. For instance, the player knows which of the fourth and fifth fingers of his right hand are touching the keyboard; the question is where that finger is touching, and that question is answered by the visual feedback on monitor 102. It should be noted that the illustration of finger positioning on a keyboard is exemplary only; the same embodiment can be used to measure and provide visual feedback on finger positioning along a violin, a cello, or any other instrument, without departing from the scope of the invention. Moreover, it is even possible to enable meaningful music practice to be accomplished without a keyboard or other instrument at all; if a proximity sensor array can detect finger positions above a desk or table (for instance by use of lasers), and if it can also detect finger contact with the table or desk (again, using lasers, or pressure sensors), then a player can practice on a desk in a hotel room (for example) and build finger dexterity by focusing on the visual feedback provided on monitor 102 (which gets the signal from display module 904 as in other embodiments). Additionally, audio feedback can be provided via audio device 905, in the form of MIDI-generated music from personal computer 103 (on which display module 904 executes) so that the player can hear the results of her practice efforts even though no keyboard is available.

Figure 10:
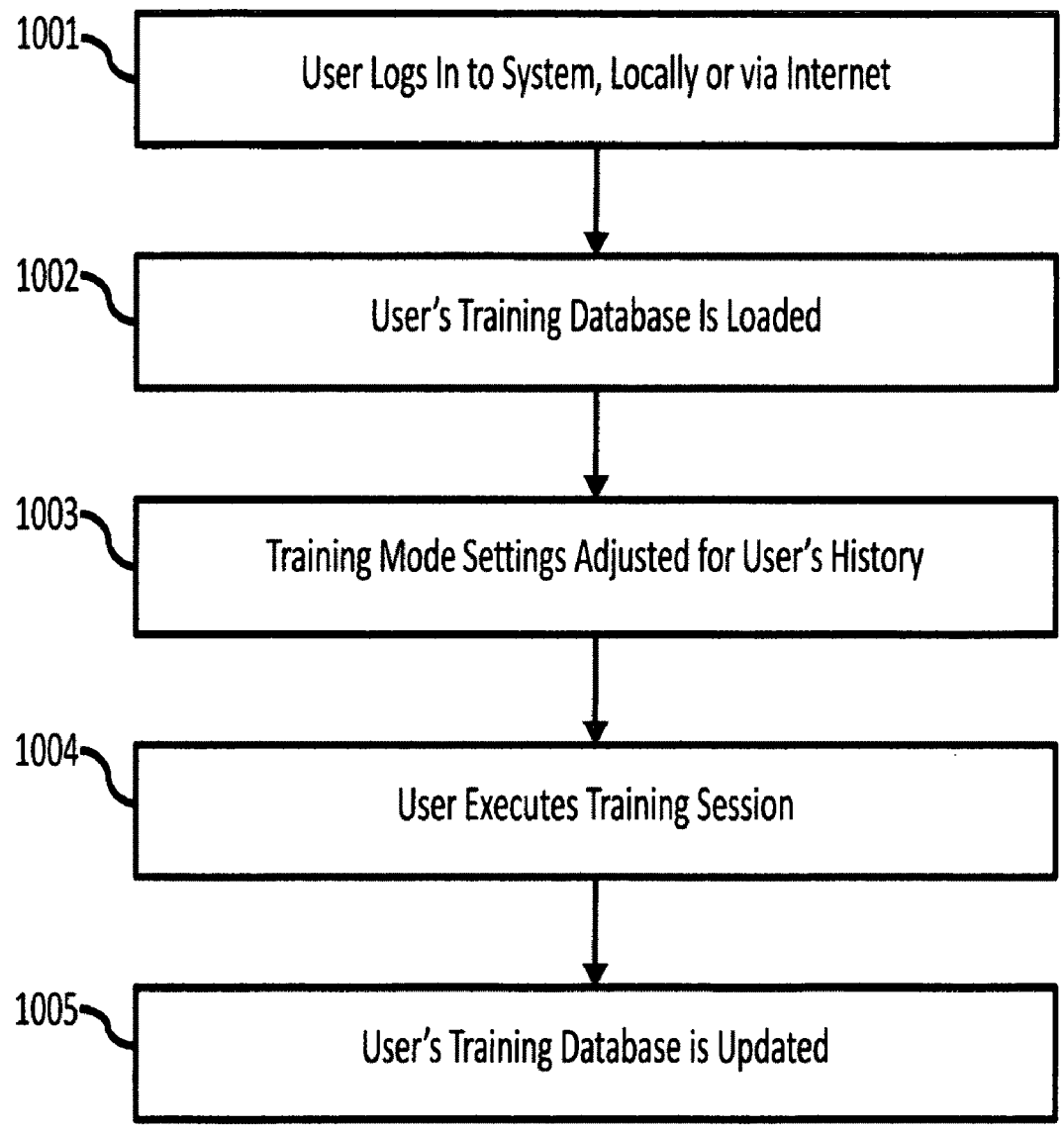
FIG. 10 illustrates a method according to the invention for customizing the system based on a user's history.

FIG. 10 illustrates a method by which the invention adapts to different users' learning profiles to provide an optimal learning experience. Each time a user starts a session, she is able to (or optionally is required to) log in, in step 1001, thus identifying herself to the system (this works equally well in single-player mode or in multi-player modes, and can be used for competition adaptation as well as training adaptation). In step 1002, a database of training (or competitive) information about the logged in user is loaded, either from a file residing on comparison module 302 or on server 801. In step 1003, training mode settings for the user are adjusted based on her history; in another embodiment, competitive settings are similarly loaded based on history. Examples of settings which could be managed in this way include how fast to migrate a user between levels of difficulty; how many repetitions are typically required to get a passage to a high level of accuracy; what is the maximum velocity this player is able to achieve (velocity meaning here speed at which the player can correctly play a run of notes of very short duration, such as a scale); what is the highest exercise the player has successfully played once, or perhaps has been able to play correctly three times in a row (often this is quite difficult for newer players to do). Upon completion of a training (or competitive) session after step 1004, the user's training (or competitive) database is updated to reflect progress (good or bad) during that session.

It should be understood that all embodiments disclosed herein are exemplary in nature and should not be construed to eliminate equivalent embodiments.

What is claimed is:

1. A system comprising:
   means for receiving a first input from an electronic device, said first input pertaining to performance of music by a user;
   means for receiving a second input, said second input pertaining at least to music intended to be performed by the user; and
   a comparison module software executing on a computer and adapted to receive said first input and to receive said second input;
   wherein the comparison module compares the first input from a user to the second input to produce at least one indicia of the user's success in performing the intended music correctly; and
   wherein the comparison module sends to a display module associated with the user information including at least the music intended to be performed by the user and the indicia of the user's success in performing the intended music correctly; and
   wherein the comparison module further sends to the display module associated with the user a timing signal suitable for indicating the speed at which the music should be shown on the display and played by the user, said timing signal computed according to two or more tempo modes selectable by the user, at least one of which varies continuously based at least in part based on the user's actual performance of the music being displayed.

2. The system of claim 1, wherein the comparison module provides an audio feedback signal to the display module associated with the user, the audio signal based on at least one indicia of the user's success in performing the intended music correctly.

3. The system of claim 1, wherein the second input is a MIDI data file.

4. A method for conducting a musical computer game, comprising the steps of:
   (a) receiving a first input from an electronic device, said first input pertaining to performance of music by a user;
   (b) receiving a second input pertaining at least to music intended to be performed by the user;
   (c) comparing the first input and the second input and computing at least one indicia of the user's success in performing the intended music;
   (d) sending to a display module associated with the user information including at least the music intended to be performed by the user and the indicia of the user's success in performing the intended music correctly;
   (e) computing a timing signal suitable for indicating the speed at which the music should be shown on the display and played by the user, said timing signal computed according to two or more tempo modes selectable by the user, at least one of which varies continuously based at least in part based on the user's actual performance of the music being displayed; and
   (f) sending the timing signal to the display module.

* * * * *